Sept. 4, 1934.  E. V. SCHAAL  1,972,320
REAR VIEW MIRROR
Filed Sept. 23, 1930  2 Sheets-Sheet 1
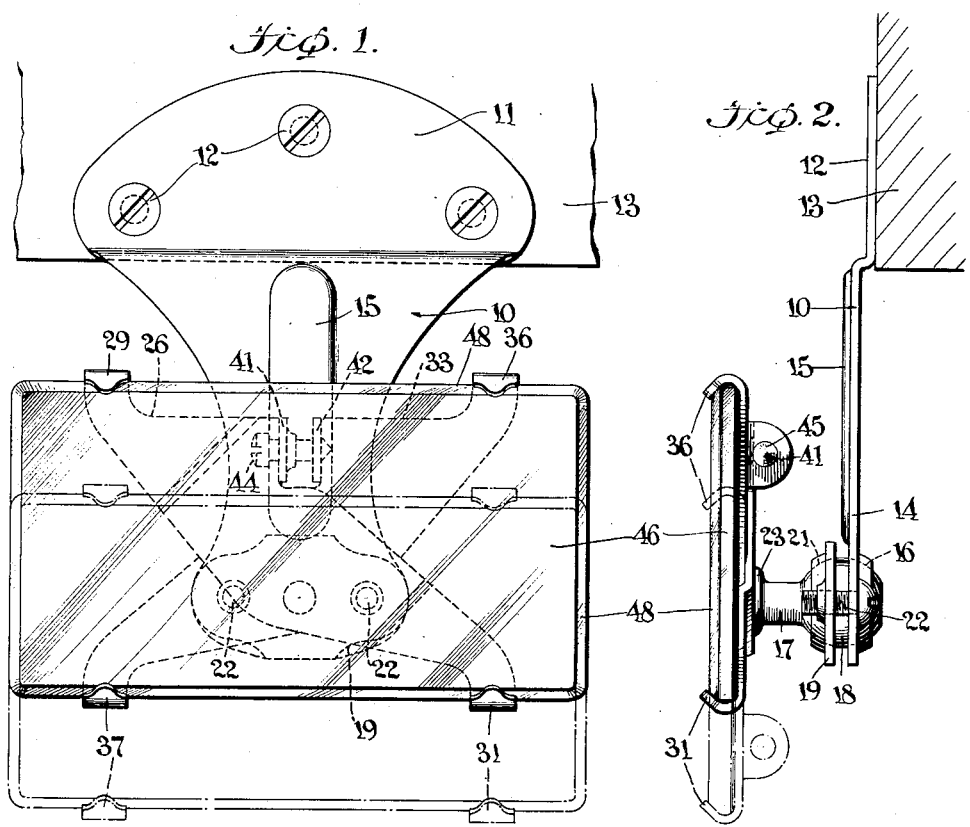
Inventor
Earl V. Schaal,
By Barton A. Bean Jr.
Attorney

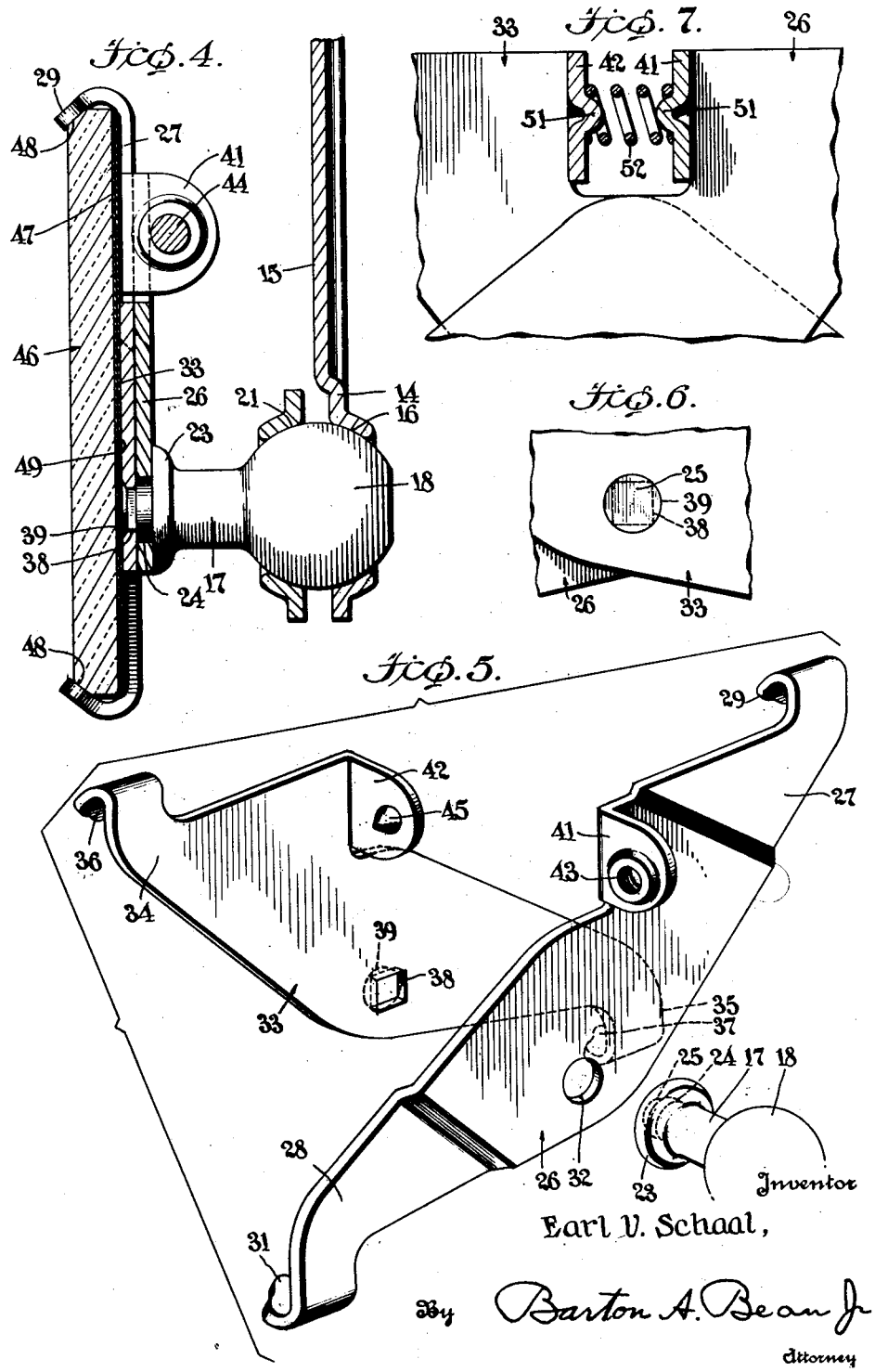

Patented Sept. 4, 1934

1,972,320

UNITED STATES PATENT OFFICE 1,972,320

REAR VIEW MIRROR

Earl V. Schaal, Buffalo, N. Y., assignor to Trico Products Corporation, Buffalo, N. Y.

Application September 23, 1930, Serial No. 483,866

6 Claims. (Cl. 45—97)

This invention relates to mirrors and particularly to rear view mirrors adapted to be mounted upon motor vehicles for enabling the vehicle operator to readily observe traffic conditions to the rear.

Such rear view mirrors are conventionally mounted upon the header bar above the vehicle windshield in such position that the driver, by casting his eyes only slightly above the normal line of vision through the windshield, may observe the reflected image in the mirror of traffic to the rear of the vehicle, the reflected lines of vision passing through the rear window of the vehicle. The present invention contemplates an improved mounting which will afford a rigid support for the mirror and will at the same time permit of adjustment of the mirror to positions suitable for various operators and types of vehicles and will enable ready removal and replacement of the mirror proper relative to the mounting for cleaning or repairing.

The reflective bodies of the mirrors usually comprise silvered glass plates which are extremely frangible and it is a purpose of the present invention to provide a means, for holding such a body to the mirror support, which may be finely adjusted to grip the mirror with pressure sufficient to retain it in use, but light enough to avoid cracking or breaking it in attachment or in subsequent use on the vehicle. These and other objects and advantages will become apparent from a perusal of the following description of typical embodiments of the invention, reference being made to the accompanying drawings, wherein:—

Fig. 1 is a front eelvation of the mirror and mirror mounting attached to the header bar of an automative vehicle, the broken lines indicating an adjustable position of the mirror;

Fig. 2 is an end view of the device shown in Fig. 1, a portion of the header bar being shown in cross section;

Fig. 3 is a rear view of the mirror gripping portion of the bracket shown in Fig. 1;

Fig. 4 is a vertical cross sectional view taken through the center of the device shown in Fig. 1;

Fig. 5 is a disassembled perspective view of the mirror gripping portion of the device;

Fig. 6 is a fragmentary detail view of a portion of the mounting; and

Fig. 7 is a fragmentary rear view of a modified mirror mounting.

As shown in Fig. 1, the device includes a stamped metal bracket 10, having an enlarged upper portion 11, through which fasteners 12 are passed to secure the bracket to the header bar 13, or other portion of the vehicle, and a depending portion 14 rigidified by a corrugation 15 and provided with a recessed opening 16. A supporting shank 17 has a spherical enlargement 18 formed at its rear for seating in the recess 16, being adjustably retained in the recess by a plate 19. The latter has a recessed aperture 21 of larger diameter than the shank 18 and is attached to the bracket portion 14 by screws 22 extending through the bracket and threaded into the plate. An annular flange 23 is formed adjacent the forward end of the shank 17, and a shoulder or journal portion 24 is provided immediately forward of the flange, the end of the shank originally terminating by a reduced portion 25, preferably of circular cross-section as indicated in Fig. 5.

A mirror engaging member 26, comprising diagonally extending arms 27 and 28 having hooked end portions 29 and 31 respectively, is provided with a substantially central opening 32 for receiving the journal portion 24 of the shank. A similar but reversed member 33 has a pair of diagonally extending arms 34 and 35 with hooked ends 36 and 37 respectively. This mirror engaging member is provided with a substantially central opening 38, which is preferably of square or other non-circular shape and of size sufficient to receive the circular shank end 25, the outer end of the opening 38 being counter-sunk as indicated at 39 in Figs. 4 and 5. In mounting the members 26 and 33 upon the shank 17, the member 26 is fitted over the bearing portion 24 in abutment with the flange 23, as depicted in Fig. 4, and the member 33 is fitted over the shank end 25 abutting the member 26. The originally circular reduced end 25 is then swaged or riveted over the counter-sunk end of the opening 38 as illustrated in Figs. 4 and 6 to deform the originally circular reduced end 25 to fill out the non-circular opening and the counter-sunk portion of the arm member 33, so that the members 26 and 33 are positively retained on the shank 17, the member 33 being fixedly held thereon, and the member 26 being capable of angular movement about the axis of the shank.

A pair of rearwardly extending lugs 41 and 42 are formed on the upper and inner portions of the respective members 26 and 33. The lug 41 is provided with a threaded aperture 43 to receive adjusting screw 44 and the lug 42 is recessed at 45 to provide a seat for the screw end. The mirror body 46, preferably formed of plate glass having the rear surface thereof silvered as indicated at 47 and having forward beveled edges 48, is disposed between the upper hooked ends 29 and 36 and the lower hooked ends 31 and 37 of the members 26 and 33. A resilient backing or gasket 49 of felt or other shock absorbing material is preferably secured to the rear face of the mirror adjacent to the arms 27, 28, 34 and 35.

Before the mirror body 46 is attached to the mounting, the screw 44 is turned outwardly of the lug 41 permitting the member 26 to be rotated relative to the member 33, in a clockwise direction as viewed in Fig. 1, moving the lugs 41 and 42 together and the hooks 29 and 36 away from the hooks 37 and 31, respectively. The mirror body 46 is then placed between the hooks and the screw 44 turned to spread apart the lugs 41 and 42, thus drawing the hooks 29 and 36 toward the hooks 37 and 31. As this movement is continued the hooks will engage the beveled edges 48 of the mirror, moving the body 46 rearwardly and compressing the resilient gasket 49. In this manner screw 44 may be adjusted until the hooks engage the mirror with just sufficient pressure to hold it properly in place.

The screws 22 may be loosened for adjusting the mirror to the desired angular position with respect to the vehicle and may then be tightened, clamping the shank end 18 between the bracket portion 14 and the plate 19. The end 18 being spherical permits of such angular adjustment about any axis passing through its center. It will be noted that the shank 17 is spaced from the center of the mirror in order that the mirror and shank may, if desired, be rotated about a horizontal axis through an arc of 180° to lower the mirror to the broken line position indicated in Fig. 1.

In Fig. 7 is illustrated a modified construction in which the lugs 41 and 42 of the respective members 26 and 33 are formed with inwardly pressed knobs 51 for retaining a coiled compression spring 52. The latter is of such strength as to press the hooks 26 and 36 toward the hooks 37 and 31 with sufficient pressure to retain the mirror 48. The mirror may be readily removed, however, by manually moving the lugs 41 and 42 toward each other and thereby freeing the mirror from holding engagement of the hooks.

It will now be understood that the present invention provides a simple and secure means for mounting a rear view mirror, the ball and socket connection of the shank 17 with the bracket 11 affording for substantially universal adjustment of the mirror, and the crossed diagonal arms 26 and 33 providing means for positively retaining the reflector body 46. The arms are readily adjustable to grip the mirror with the desired pressure or to free the mirror for removal from the mounting by the releasable means which consists of the screw 44 illustrated in Figs. 1 to 5 inclusive, or the compression spring shown in Fig. 7.

It will further be understood that the devices described are merely illustrative of the principles of the invention which is intended to be of scope commensurate with the appended claims.

What is claimed is:

1. A mounting for a mirror body comprising a shank, a pair of angularly disposed arm members carried by said shank and movable relative to each other in a plane normal to the axis of said shank, said arm members having hooks at the outer ends thereof for engaging said mirror body, and screw threaded means associated with said arm members and adapted to effect angular movement between said arm members to carry the said hooks of one of said members toward the hooks of the other of said members.

2. A mounting for a mirror body comprising a pair of pivotally connected and angularly disposed arm members, means on the ends of the arms for engaging opposed edges of the mirror body, a lug on each of said members, and adjustable screw means associated with said lugs for effecting relative angular movement of said members to cause the means on the ends thereof to grip said mirror body.

3. A mounting for a mirror body comprising a supporting shank having an annular flange spaced from one end thereof and a journal portion of greater cross section than the said end of said shank, said journal portion being disposed between said flange and said end, an arm rotatably mounted on said journal portion and adapted to engage said mirror body, another arm mounted on the end of said shank, said other arm being adapted to engage said mirror body and having a non-circular aperture for receiving said shank end, and said end being riveted thereover, whereby said other arm is fixed to said shank and retains said first arm on said shank for rotation relative thereto for clamping said mirror body between said first arm and said other arm.

4. Means for mounting a mirror body upon a vehicle, comprising a shank angularly adjustable about the axis thereof relative to said vehicle, an arm fixed to said shank and extending in a plane substantially normal to the axis of the shank, a second arm in a plane substantially normal to the axis of the shank, said arm being pivotally secured to the shank for pivotal movement in the plane of its extension relative to the shanks and to the first mentioned arm, means at an end of one arm for engaging one edge of the mirror body and means at an end of the other arm for engaging an opposite edge of the mirror body and means for urging relative angular movement of the arms to cause said means at the ends of the arms to clamp the mirror body therebetween.

5. Means for mounting a mirror body comprising a supporting shank and a pair of arms mounted thereon, said shank having a round portion and shoulder means adjacent the round portion for seating one of said arms for angular movement relative to the shank about the axis thereof, said shank having retaining means for securing the other of said arms thereto and fixed therewith, and said arms having means thereon spaced radially from the shank for engaging a mirror body.

6. A mounting for a mirror body comprising a pair of pivotally connected and angularly disposed arm members, means on end portions of the arms for engaging opposed edges of the mirror body, a lug formed on each of said members, and a spring disposed between said lugs for urging said members to effect clamping movement of the means for engaging the mirror body, one of said lugs having a knob formed thereon for aligning and retaining said spring between said lugs.

EARL V. SCHAAL.